US012719121B2

(12) United States Patent
Zhang et al.

(10) Patent No.: US 12,719,121 B2
(45) Date of Patent: Aug. 25, 2026

(54) ELECTROCHEMICAL APPARATUS AND ELECTRONIC DEVICE

(71) Applicant: Ningde Amperex Technology Limited, Ningde City (CN)

(72) Inventors: Guowen Zhang, Ningde City (CN); Wu Ma, Ningde City (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 694 days.

(21) Appl. No.: 18/179,017

(22) Filed: Mar. 6, 2023

(65) Prior Publication Data

US 2023/0291046 A1 Sep. 14, 2023

(30) Foreign Application Priority Data

Mar. 8, 2022 (CN) ......................... 202210220822.5

(51) Int. Cl.
*H01M 50/204* (2021.01)
*H01M 10/04* (2006.01)

(52) U.S. Cl.
CPC ..... *H01M 50/204* (2021.01); *H01M 10/0459* (2013.01)

(58) Field of Classification Search
CPC ........................ H01M 50/204; H01M 10/0459
See application file for complete search history.

(56) References Cited

U.S. PATENT DOCUMENTS

2005/0287434 A1 12/2005 Kim et al.
2016/0308188 A1* 10/2016 Jang ..................... H01M 50/15
2018/0269462 A1* 9/2018 Ledoux ............... H01M 50/561
2019/0245302 A1 8/2019 Ozasa et al.
2023/0096112 A1 3/2023 Tian et al.

FOREIGN PATENT DOCUMENTS

CN 110579891 A 12/2019
CN 212276142 U 1/2021
CN 112415769 A 2/2021
CN 212515228 U 2/2021
CN 113419355 A 9/2021
EP 4080598 A1 10/2022
WO WO-2021146870 A1 * 7/2021 ............ H01M 4/667

OTHER PUBLICATIONS

Supplementary European Search Report mailed Aug. 11, 2023, in European Application No. 23160476.0, 8 pages.
Communication pursuant to Article 94(3) EPC mailed Jul. 28, 2025, in European Application No. 23160476.0, 5 pages.

* cited by examiner

*Primary Examiner* — Jane J Rhee
(74) *Attorney, Agent, or Firm* — XSENSUS LLP

(57) ABSTRACT

An electrochemical apparatus and an electronic device, the electrochemical apparatus including a housing, an electrode assembly, and a first electrode. The housing includes a first part and a second part that are interconnected, where the electrode assembly is accommodated in an accommodating cavity of the first part. The first electrode includes a first inserting portion and a first flange portion, where the first flange portion and the first inserting portion are integrally formed, the first flange portion embeddedly snap-fits into the second part, the first flange portion is connected to the electrode assembly, and the first inserting portion extends away from the accommodating cavity and protrudes from an outer surface of the second part.

16 Claims, 8 Drawing Sheets

Cross section A-A

ELECTROCHEMICAL APPARATUS AND ELECTRONIC DEVICE

CROSS-REFERENCE TO RELATED APPLICATIONS

This application claims priority to Chinese Patent Application No. 202210220822.5, filed on Mar. 8, 2022, the whole disclosure of which is incorporated herein by reference.

TECHNICAL FIELD

This application relates to the field of battery technologies, and in particular, to an electrochemical apparatus and an electronic device.

BACKGROUND

Pouch cells have advantages of high capacity, light weight, safe performance, and being not prone to explosion. With these advantages, pouch cells are being used as the power source for more and more mobile devices operating nowadays. During use of a mobile device, regular operations such as charging impose relatively high requirements on rigidity of the cell. For pouch cells, however, due to insufficient rigidity in an electrode lead, when the electrode is connected to an external device, it is hard for the electrode to support the weight of the cell. As a result, the electrode is unreliably connected to the device and even the electrode is bent or broken, thus failing to achieve a mechanically secured connection to the device.

SUMMARY

This application provides an electrochemical apparatus and an electronic device, to at least improve rigidity of an electrode lead.

Technical solutions of this application are implemented as follows:

In a first aspect, an embodiment of this application provides an electrochemical apparatus including a housing and an electrode assembly, where the housing includes a first part and a second part that are interconnected, the first part encloses an accommodating cavity, and the electrode assembly is accommodated in the accommodating cavity. The electrochemical apparatus further includes a first electrode, where the first electrode includes a first inserting portion and a first flange portion, the first flange portion and the first inserting portion are integrally formed, the first flange portion embeddedly snap-fits into the second part, the first flange portion is connected to the electrode assembly, and the first inserting portion extends away from the accommodating cavity and protrudes from an outer surface of the second part. If the first inserting part is directly welded to the adapter piece, and then plugged into the external device, the first inserting part cannot bear the weight of the battery; if the first flange and the first inserting part are welded, the welded will be damaged Increase the internal resistance. During the use of the battery, the temperature of the welding point rises relatively quickly, thus the electrolyte surrounding the welded is unstable, and the side reactions are prone to occur, which reduce the safety performance of the battery. The first flange and the first plug-in part are integrally formed to form the first electrode, which saves the welding process, improves the resistance of the first electrode, and improves the safety performance of the battery. Moreover because the first flange of the first electrode is in contact with the adapter, the contact area between the first electrode and the adapter is increased, and the current carrying capacity of the first electrode is improved.

With the first flange portion of the first electrode embeddedly snap-fitting into the second part of the housing, the first flange portion is able to provide position limiting and increase a contact area between the first electrode and the housing so as to increase grip force and bonding strength between the first electrode and the housing, making connection between the first electrode and the housing more reliable so that the first electrode is rigid enough to support the entire electrochemical apparatus.

According to some embodiments of this application, the electrochemical apparatus further includes a second electrode, where the second electrode is spaced apart from the first electrode. The second electrode includes a second inserting portion and a second flange portion, where the second flange portion and the second inserting portion are integrally formed, the second flange portion embeddedly snap-fits into the second part, the second flange portion is connected to the electrode assembly, and the second inserting portion extends away from the accommodating cavity and protrudes from the outer surface of the second part.

The second flange portion is able to provide position limiting and increase a contact area between the second electrode and the housing so as to increase the grip force and bonding strength between the second electrode and the housing, making connection between the second electrode and the housing more reliable so that the second electrode is rigid enough to support the entire electrochemical apparatus.

According to some embodiments of this application, the first inserting portion extends at the outer surface of the second part along a first direction. In a second direction, the first flange portion is wider than the first inserting portion; and/or along a third direction, the first flange portion is higher than the first inserting portion.

The second inserting portion extends at the outer surface of the second part along the first direction. In the second direction, the second flange portion is wider than the second inserting portion; and/or in the third direction, the second flange portion is higher than the second inserting portion. The first direction, the second direction, and the third direction are perpendicular to each other.

The two flange portions having larger sizes than the inserting portions in the second direction and/or the third direction allows the two flange portions to provide good limiting effect so as to increase the contact area between the two electrodes and the housing and improve the grip force and bonding strength between the electrodes and the housing, thereby improving connection stability between the electrodes and the housing.

According to some embodiments of this application, in the first direction, the first flange portion has a thickness of 0.05 mm to 3 mm; and/or in the first direction, two sides of the first flange portion abut against a first adhesive layer, the first adhesive layer having a thickness of 0.1 mm to 3 mm. In the first direction, the second flange portion has a thickness of 0.05 mm to 3 mm; and/or in the first direction, two sides of the second flange portion abut against a second adhesive layer, the second adhesive layer having a thickness of 0.1 mm to 3 mm.

Enough thickness of the first adhesive layer effectively guarantees that the second part can stably bear forces to reduce deformation or fracture of the second part. The same applies for the second adhesive layer.

According to some embodiments of this application, the second part is provided with a first snap-fit cavity and a first extension hole that communicate with each other. The first snap-fit cavity matches the first flange portion, the first flange portion embeddedly snap-fits into the first snap-fit cavity, and the first snap-fit cavity communicates with the accommodating cavity. The first extension hole matches the first inserting portion, and the first inserting portion extends out of the first extension hole and protrudes from the outer surface of the second part.

The second part is further provided with a second snap-fit cavity and a second extension hole that communicate with each other. The second snap-fit cavity matches the second flange portion, the second flange portion embeddedly snap-fits into the second snap-fit cavity, and the second snap-fit cavity communicates with the accommodating cavity. The second extension hole matches the second inserting portion, and the second inserting portion extends out of the second extension hole and protrudes from the outer surface of the second part.

With the first snap-fit cavity matching the first flange portion, the first flange portion perfectly fits onto an inner wall of the first snap-fit cavity to further increase the contact area between the first flange portion and the second part, guaranteeing the connection stability between the first electrode and the housing. Similarly, the first extension hole matching the first inserting portion makes an inner wall of the first extension hole perfectly fit onto the first inserting portion so as to increase the contact area between the first inserting portion and the second part, which also allows the first extension hole to limit the position of the first inserting portion, guaranteeing that the first inserting portion extends out entirely along the first extension hole. The same applies for the second snap-fit cavity and the second extension hole.

According to some embodiments of this application, the first flange portion and the first snap-fit cavity are both provided in plurality, where the plurality of first flange portions are stacked sequentially along a direction from the first snap-fit cavity to the first extension hole, two adjacent first flange portions have different lengths in a direction perpendicular to the stacking direction of the plurality of first flange portions, and the first flange portions each snap-fit into one matching first snap-fit cavity; and/or, the second flange portion and the second snap-fit cavity are both provided in plurality, where the plurality of second flange portions are stacked sequentially along a direction from the second snap-fit cavity to the second extension hole, two adjacent second flange portions have different lengths in a direction perpendicular to the stacking direction of the plurality of second flange portions, and the second flange portions each snap-fit into one matching second snap-fit cavity.

The multiple layers of first flange portions being stacked increases the total size of the first flange portion in the first direction, alleviating the deformation of the first flange portion. In addition, two adjacent first flange portions having different lengths facilitates the presence of the first adhesive layer on both sides of each longer first flange portion, where the first adhesive layer abuts against and supports the longer first flange portion. The sufficiency of first adhesive layer effectively guarantees that the second part can stably bear forces to reduce the deformation or fracture of the second part. The same applies for the stacking of multiple layers of second flange portions.

According to some embodiments of this application, the first inserting portion and the second inserting portion are both configured for inserting into an external device, where the outer surfaces of the first inserting portion and the second inserting portion are both provided with a groove for snap fitting with the external device.

An elastic protrusion may be provided inside an insertion hole of the external device. When the first inserting portion is inserted into the insertion hole of the external device, a head end of the first inserting portion pushes against and compresses a first elastic protrusion, and the first elastic protrusion compressed allows the first inserting portion to go deeper into the insertion hole. When the first inserting portion is completely inserted into the first insertion hole, the first elastic protrusion exactly snap-fits into a first groove embeddedly, so that the first inserting portion is inserted and fixed in the first insertion hole of the external device, improving the grip force and bonding strength between the first electrode and the external device.

According to some embodiments of this application, the housing further includes a third part, where the third part is connected to the first part, and the third part is opposite the second part. The electrochemical apparatus further includes a third electrode and a fourth electrode, where the third electrode is opposite the first electrode, and the fourth electrode is opposite the second electrode. The third electrode includes a third inserting portion and a third flange portion, and the fourth electrode includes a fourth inserting portion and a fourth flange portion, where the third flange portion and the fourth flange portion both embeddedly snap-fit into the third part and are both connected to the electrode assembly, and the third inserting portion and the fourth inserting portion both protrude from an outer surface of the third part.

Two ends of the housing, that is, the second part and the third part, are both provided with electrodes, making it possible to connect a plurality of electrochemical apparatus in series. In the series connection, the first electrode may be connected to the third electrode, and the second electrode may be connected to the fourth electrode. In addition, because the two ends of the housing are both provided with electrodes, one electrochemical apparatus can be inserted to two external devices to supply power to the two external devices at the same time.

According to some embodiments of this application, the electrochemical apparatus further includes a first insulator and a second insulator. The first insulator is fixed to the second part and abuts between the first inserting portion and the second inserting portion. The second insulator is fixed to the third part and abuts between the third inserting portion and the fourth inserting portion.

The first insulator is configured to support the first inserting portion and the second inserting portion, and when the two inserting portions are inserted to an external device, such design can effectively add to the reliability of insertion of the two inserting portions. The same applies for the second insulator.

According to some embodiments of this application, in a second aspect, this application further provides an electronic device including the electrochemical apparatus according to any one of the foregoing embodiments.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

Figure 1:
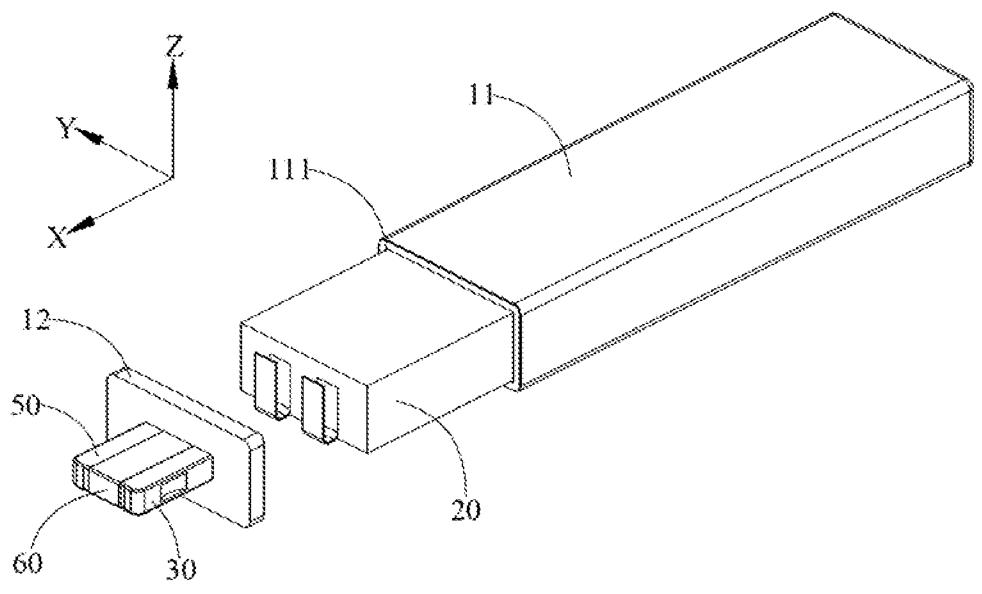
FIG. 1 is an exploded view of an electrochemical apparatus according to some embodiments of this application.

Reference signs in the embodiments illustrated are as follows:

10. housing; 11. first part; 111. first opening; 12. second part; 121. first adhesive layer; 122. first snap-fit cavity; 123. first extension hole; 13. third part;

20. electrode assembly;

30. first electrode; 31. first inserting portion; 32. first flange portion; 33, first groove; 331. head end;

40. external device; 41. insertion hole; 42. first elastic protrusion;

50. second electrode; 60. first insulator; 70. third electrode;

80. fourth electrode; and 90. second insulator.

DETAILED DESCRIPTION

The following describes in detail embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms “include”, “comprise”, and “have” and any other variations thereof in the specification, claims and brief description of drawings of this application are intended to cover non-exclusive inclusions.

In the description of the illustrated embodiments of this application, the terms “first”, “second” and the like are merely intended to distinguish between different objects, and shall not be understood as any indication or implication of relative importance or any implicit indication of the number, sequence or primary-secondary relationship of the technical features indicated. In the description of this application, “a plurality of” means at least two unless otherwise specifically stated.

In this specification, reference to “embodiment” means that specific features, structures or characteristics described with reference to the embodiment may be incorporated in at least one embodiment of this application. The word “embodiment” appearing in various places in the specification does not necessarily refer to the same embodiment or an independent or alternative embodiment that is exclusive of other embodiments.

In the description of the illustrated embodiments of this application, the orientations or positional relationships indicated by the technical terms “middle”, “length”, “width”, “thickness”, and the like are based on the orientations or positional relationships as shown in the accompanying drawings. These terms are merely for ease and brevity of description of the illustrated of this application rather than indicating or implying that the apparatuses or components mentioned must have the orientations as specified or must be constructed or manipulated according to orientations as specified, and therefore shall not be construed as any limitations on embodiments of this application.

In the description of the illustrated embodiments of this application, unless otherwise specified and defined explicitly, the terms “mount”, “connect”, “join”, and “fasten” should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

In addition, technical features involved in different embodiments of this application that are described below may be combined as long as they do not conflict with each other.

Pouch cells have advantages of high capacity, light weight, safe performance, and being not prone to explosion. With these advantages, pouch cells are being used as the power source for more and more mobile devices operating nowadays. During use of a mobile device, regular operations such as charging impose relatively high requirements on rigidity of the cell. For pouch cells, however, due to their soft housings and insufficient rigidity in the electrode lead, when the electrode is connected to an external device, it is hard for the electrode to support the weight of the cell. As a result, the electrode is unreliably connected to the device and even the electrode is bent or broken, thus failing to achieve a mechanically secured connection to the device.

Figure 2:
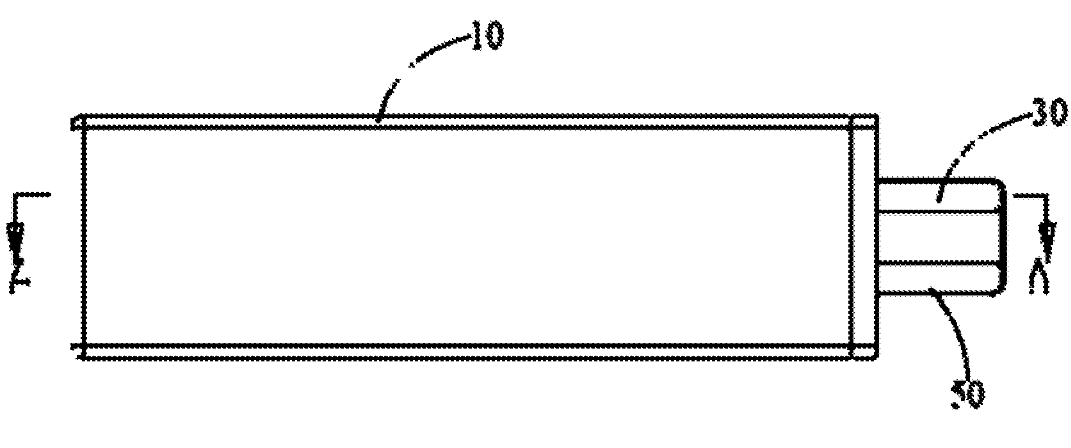
FIG. 2 is a schematic structural diagram of an electrochemical apparatus according to some embodiments of this application.
Figure 2:
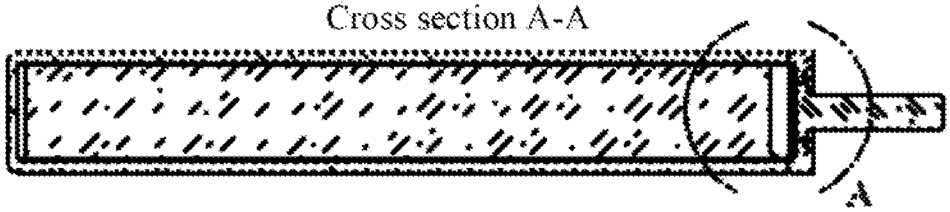
Figure 3:
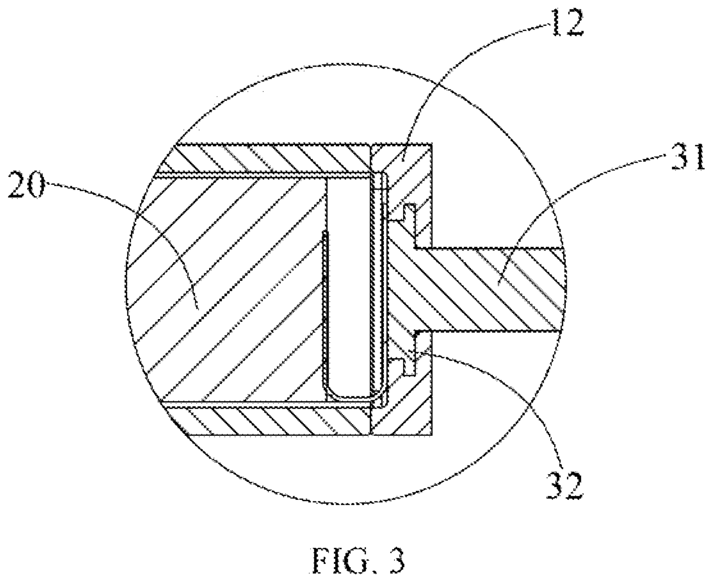
FIG. 3 is a locally enlarged view of a position A in FIG. 2.

To alleviate this problem, in a first aspect, embodiments of this application provide an electrochemical apparatus. Referring to FIG. 1 and FIG. 2 together, the electrochemical apparatus includes a housing 10, an electrode assembly 20, and a first electrode 30.

For the housing 10, as shown in FIG. 1, the housing 10 may be designed into a flat cuboid as a whole, including a length direction, a width direction, and a height direction, where the length direction is an X direction in FIG. 1, the width direction is a Y direction in FIG. 1, and the height direction is a Z direction in FIG. 1. For ease of description, in this application, the X direction is defined as a first direction, the Y direction is defined as a second direction, and the Z direction is defined as a third direction, where the first direction, the second direction, and the third direction are perpendicular to each other. In other embodiments, the housing 10 may alternatively be designed into a cylinder, an arc, an oval, a polygon prism, or the like.

As shown in FIG. 1, the housing 10 includes a first part 11 and a second part 12, where the first part 11 and the second part 12 may be made of hard plastics resistant to electrolyte, for example, LCP, PHBA, PET, PVC, Pi, PP, ABS, PC, or PA. The first part 11 encloses an accommodating cavity (not shown in the figure), where the accommodating cavity is configured to accommodate the electrode assembly 20. The first part 11 of the housing 10 is provided with a first opening 111, where the first opening 111 communicates with the accommodating cavity, and the second part 12 is connected to the first opening 111. The second part 12 and the first part 1I may be connected through welding, snap fit, or bonding.

For the electrode assembly 20, as shown in FIG. 1, the electrode assembly 20 is accommodated in the accommodating cavity. The electrode assembly 20 typically includes a positive electrode plate, a separator, and a negative electrode plate, where the separator is sandwiched between the positive electrode plate and the negative electrode plate to separate the positive electrode plate and the negative electrode plate, and the positive electrode plate, separator, and negative electrode plate are sequentially stacked or wound to form the electrode assembly 20.

For the above first electrode 30, the first electrode 30 is an electrode lead for the electrode assembly 20 and may be provided as a positive electrode or a negative electrode. With the positive electrode as an example, the first electrode 30 may be made of Al, Ni, stainless steel, composite materials, or the like and may be processed, for example, through machine processing or stamping.

As shown in FIG. 1 to FIG. 5, the first electrode 30 is disposed at the second part 12, and the first electrode 30 includes a first inserting portion 31 and a first flange portion 32, where the first inserting portion 31 is fixed to the first flange portion 32, which means the first inserting portion 31 and the first flange portion 32 are integrally formed, for example, through welding. The first flange portion 32 embeddedly snap-fits into the second part 12, and the first flange portion 32 is connected to the electrode assembly 20. The first inserting portion 31 extends away from the accommodating cavity and protrudes from an outer surface of the second part 12.

The first inserting portion 31 may be designed into a cuboid, cylinder, polygon prism, or the like as a whole. In an embodiment, with a cuboid first inserting portion 31 as an example, in the first direction, the first inserting portion 31 may be designed with a length of 0.1 mm to 20 mm, and in the second direction, the first inserting portion 31 may be designed with a width of 0.1 mm to 10 mm, where typically, the length of the first inserting portion 31 is greater than the width of the first inserting portion 31; and in the third direction, the rust inserting portion 31 may be designed with a height of 0.2 mm to 10 mm. In other preferable embodiments, the first inserting portion 31 has a length of 0.5 mm to 10 mm, a width of 0.5 mm to 10 mm, and a height of 1 mm to 4 mm. Furthermore, the first inserting portion 31 may be designed with a width half the length thereof. For example, the first inserting portion 31 may be designed with a length of 2 mm to 10 mm, a width of 1 mm to 5 mm, and a height of 1 mm to 4 mm.

The first flange portion 32 is configured to embeddedly fix the entire first electrode 30 into the second part 12 and may be designed into a flat plate. The first flange portion 32 is configured to increase a contact area between the first electrode 30 and the second part 12. In an embodiment, the first flange portion 32 is designed to be perpendicular to the first inserting portion. To increase total strength of the first electrode 30, the first flange portion 32 and the first inserting portion 31 may be integrally formed. The first inserting portion 31 is configured to be inserted into an external device 40. For how the first inserting portion 31 is inserted, refer to FIG. 5.

With the first flange portion 32 of the first electrode 30 embeddedly snap-fitting into the second part 12 of the housing 10, the first flange portion 32 is able to provide position limiting and increase a contact area between the first electrode 30 and the housing 10 so as to increase the grip force and bonding strength between the first electrode 30 and the housing 10, improving stability of connection between the first electrode 30 and the housing 10 so that the first electrode 30 is rigid enough to support the entire electrochemical apparatus.

According to some embodiments of this application, as shown in FIG. 1, the electrochemical apparatus further includes a second electrode 50, where the second electrode 50 is also disposed at the second part 12 of the housing 10, and the second electrode 50 is spaced apart from the first electrode 30. The second electrode 50 is a negative electrode and may be made of Cu, Ni, Li, stainless steel, or the like. The second electrode 50 may also be processed, for example, through machine processing or stamping.

The second electrode 50 may be designed with the same shape as the first electrode 30. The second electrode 50 includes a second inserting portion (not shown in the figure) and a second flange portion (not shown in the figure), where the second flange portion and the second inserting portion are integrally formed, the second flange portion embeddedly snap-fits into the second part 12, the second flange portion is connected to the electrode assembly 20, and the second inserting portion extends away from the accommodating cavity and protrudes from the outer surface of the second part 12.

In an embodiment, the second flange portion may be disposed in the same way as the first flange portion 32, where the second flange portion is parallel and symmetric to the first flange portion 32, and the second flange portion is designed to be perpendicular to the second inserting portion.

In this embodiment, with the second flange portion of the second electrode 50 embeddedly snap-fitting into the second part 12 of the housing 10, the second flange portion is able to provide position limiting and increase a contact area between the second electrode 50 and the housing 10 so as to increase the grip force and bonding strength between the first electrode 50 and the housing 10, improving connection stability between the first electrode 50 and the housing 10 so that the first electrode 50 is rigid enough to support the entire electrochemical apparatus. When the two electrodes inserted into the external device 40, the two electrodes are in parallel and are arranged symmetrically, so that the two electrodes can uniformly bear forces to further improve supporting stability of the two electrodes on the entire electrochemical apparatus.

According to some embodiments of this application, the first inserting portion 31 extends at the outer surface of the second part 12 along the first direction. In the second direction, the first flange portion 32 is wider than the first inserting portion 31; and/or in the third direction, the first flange portion 32 is higher than the first inserting portion 31.

Figure 6:
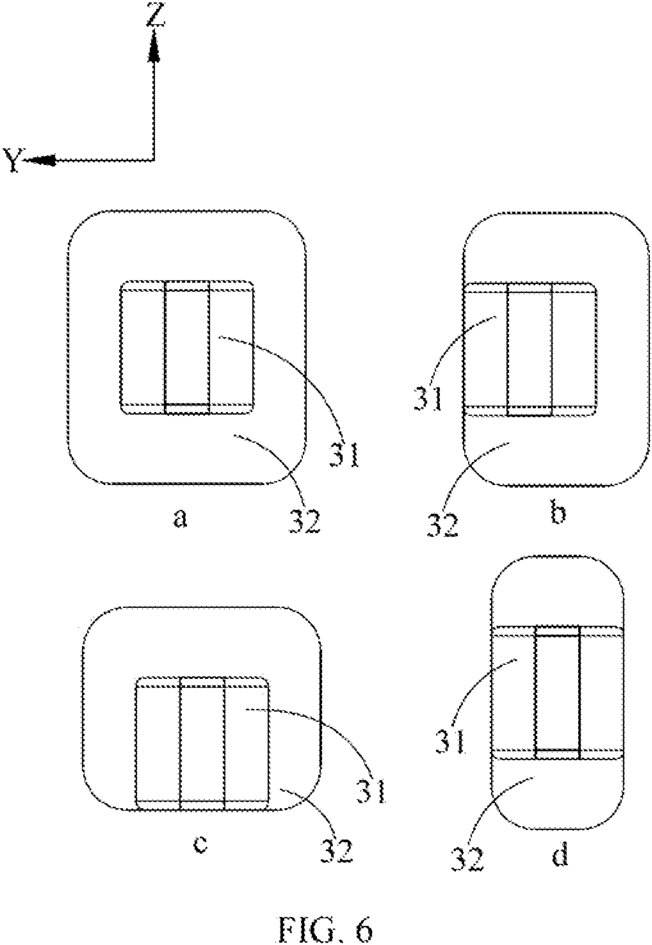
FIG. 6 is a schematic diagram of different size relationships of a first flange portion and a first inserting portion according to some embodiments of this application.

The first electrode 30 may be designed into a two-sided flange structure or a multi-sided flange structure. Specifically, as shown in a of FIG. 6, the first electrode 30 is a four-sided flange structure, where the first flange portion 32 protrudes from two sides of the first inserting portion 31 in the second direction, and the first flange portion 32 protrudes from two sides of the first inserting portion 31 in the third direction. Alternatively, as shown in b of FIG. 6, the first electrode 30 is a three-sided flange structure, where the first flange portion 32 protrudes from the two sides of the first inserting portion 31 in the third direction and protrudes from only one side of the first inserting portion 31 in the second direction; or as shown in c of FIG. 6, the first flange portion 32 protrudes from the two sides of the first inserting portion 31 in the second direction and protrudes from only one side of the first inserting portion 31 in the third direction. Alternatively, as shown in d of FIG. 6, the first electrode 30 is a two-sided flange structure, where the first flange portion 32 protrudes from the two sides of the first inserting portion 31 only in the third direction; or the first flange portion 32 protrudes from the two sides of the first inserting portion 31 only in the second direction.

It should be noted that a larger contact area for embedded snap fitting between the first flange portion 32 and the second part 12 makes a more reliable connection between the first electrode 30 and the second part 12. In other embodiments, the first electrode 30 may alternatively be designed into a single-sided flange structure. However, the single-sided flange structure has a smaller contact area with the second part 12 and the single-sided flange limits the position only in one direction, which leads to unreliable embedded snap fitting between the first electrode 30 and the second part 12. It can be understood that the four-sided flange structure is preferable because such structure is stable and allows even distribution of forces. In addition, the four-sided flange structure can increase the contact area between the first electrode 30 and the second part 12, thereby further improving the grip force and structural strength between the first electrode 30 and the second part 12.

As in the first electrode 30, the second inserting portion of the second electrode 50 extends at the outer surface of the second part 12 along the first direction. In the second direction, the second flange portion is wider than the second inserting portion; and/or in the third direction, the second flange portion is higher than the second inserting portion. The second electrode 50 may be provided as a single-sided, two-sided, or multi-sided flange structure. For details, reference may be made to the description of the first electrode 30.

The first flange portion 32 embeddedly snap-fits into the second part 12, and the second flange portion embeddedly snap-fits into the second part 12. The two flange portions having larger sizes than the inserting portions in the second direction and/or the third direction allows the two flange portions to provide good limiting effect so as to increase the contact area between the two electrodes and the housing 10 and improve the grip force and bonding strength between the electrodes and the housing 10, thereby improving connection stability between the electrodes and the housing 10.

Figure 7:
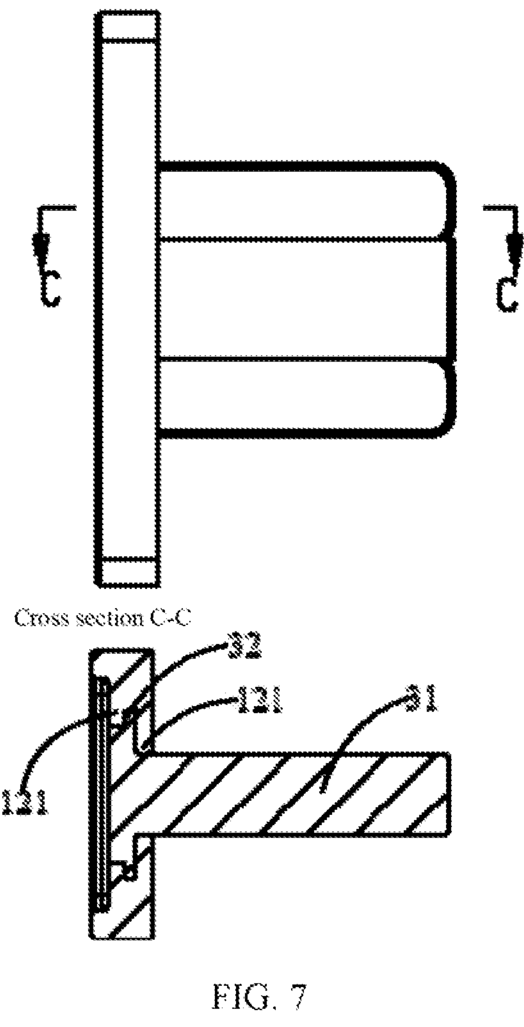
FIG. 7 is a schematic structural diagram of a first electrode according to some embodiments of this application.

According to some embodiments of this application, as shown in FIG. 7, in the first direction, the first flange portion 32 has a thickness of 0.05 mm to 3 mm; and/or, in the first direction, the two sides of the first flange portion 32 abut against a first adhesive layer 121, the first adhesive layer 121 having a thickness of 0.1 mm to 3 mm. Typically, the first adhesive layer 121 may be designed to be thicker than the first flange portion 32. Sufficient thickness of the first adhesive layer 121 effectively guarantees that the second part 12 can stably bear forces to reduce deformation or fracture of the second part 12. It should be noted that the first adhesive layer 121 may have the same or different thickness on the two sides of the first flange portion 32.

Based on the same inventive concept, in the first direction, the second flange portion has a thickness of 0.05 mm to 3 mm; and/or in the first direction, two sides of the second flange portion abut against a second adhesive layer (not shown in the figure), the second adhesive layer having a thickness of 0.1 mm to 3 mm. Sufficient thickness of the second adhesive layer effectively guarantees that the second part 12 can stably bear forces to reduce deformation or fracture of the second part 12. In other preferable embodiments, the first flange portion 32 and the second flange portion both have a thickness of 0.05 mm to 1 mm, and the first adhesive layer 121 and the second adhesive layer both have a thickness of 0.2 mm to 1 mm.

Figure 8:
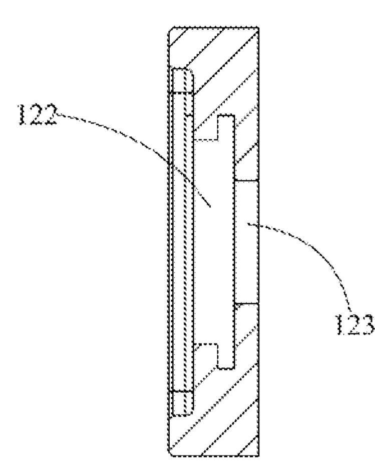
FIG. 8 is a schematic structural diagram of a second part according to some embodiments of this application.

According to some embodiments of this application, with reference to FIG. 7 and FIG. 8 together, the second part 12 is provided with a first snap-it cavity 122 and a first extension hole 123 that communicate with each other. The first snap-fit cavity 122 matches the first flange portion 32, where the first flange portion 32 embeddedly snap-fits into the first snap-fit cavity 122, and the first snap-fit cavity 122 communicates with the accommodating cavity so as to be connected to the electrode assembly 20. The first extension hole 123 matches the first inserting portion 31, where the first inserting portion 31 extends out of the first extension hole 123 and protrudes from the outer surface of the second part 12.

With the first snap-fit cavity 122 matching the first flange portion 32, the first flange portion 32 perfectly fits onto an inner wall of the first snap-fit cavity 122 to further increase a contact area between the first flange portion 32 and the second part 12, guaranteeing the stability of connection between the first electrode 30 and the housing 10. Similarly, the first extension hole 123 matching the first inserting portion 31 makes an inner wall of the first extension hole 123 perfectly fit onto the first inserting portion 31 so as to increase a contact area between the first inserting portion 31 and the second part 12, which also allows the first extension hole 123 to limit the position of the first inserting portion 31, guaranteeing that the first inserting portion 31 extends out entirely along the first extension hole 123.

Based on the same inventive concept, the second part 12 is further provided with a second snap-fit cavity (not shown in the figure) and a second extension hole (not shown in the figure) that communicate with each other. The second snap-fit cavity matches the second flange portion, the second flange portion embeddedly snap-fits into the second snap-fit cavity, and the second snap-fit cavity communicates with the accommodating cavity. The second extension hole matches the second inserting portion, and the second inserting portion extends out of the second extension hole and protrudes from the outer surface of the second part 12.

Figure 9:
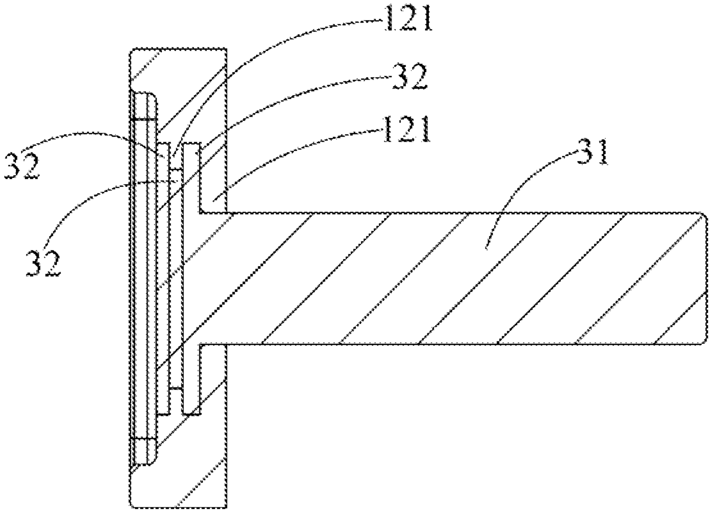
FIG. 9 is a schematic diagram of stacking of a plurality of first flange portions.

According to some embodiments of this application, as shown in FIG. 9, the first flange portion 32 and the first snap-fit cavity 122 are both provided in plurality, where the plurality of first flange portions 32 are stacked sequentially along a direction from the first snap-fit cavity 122 to the first extension hole 123, two adjacent first flange portions 32 have different lengths in a direction perpendicular to the stacking direction of the plurality of first flange portions 32, and the first flange portions 32 each snap-fit into one matching first snap-fit cavity 122. It should be noted that in this embodiment, the direction from the first snap-fit cavity 122 to the first extension hole 123 is the first direction.

The multiple layers of first flange portions 32 being stacked increases the total size of first flange portion 32 in the first direction, alleviating the deformation of the first flange portion 32. In addition, two adjacent first flange portions 32 having different lengths facilitates the presence of the first adhesive layer 121 on both sides of each longer first flange portion 32, where the first adhesive layer 121 abuts against and supports the longer first flange portion 32. The sufficiency of first adhesive layer 121 effectively guarantees that the second part 12 can stably bear forces to reduce the deformation or fracture of the second pan 12.

Based on the same inventive concept, the second flange portion and the second snap-fit cavity are both provided in plurality, where the plurality of second flange portions are stacked sequentially along a direction from the second snap-fit cavity to the second extension hole, two adjacent second flange portions have different lengths in a direction perpendicular to the stacking direction of the plurality of second flange portions, and the second flange portions each snap-fit into one matching second snap-fit cavity.

Figure 10:
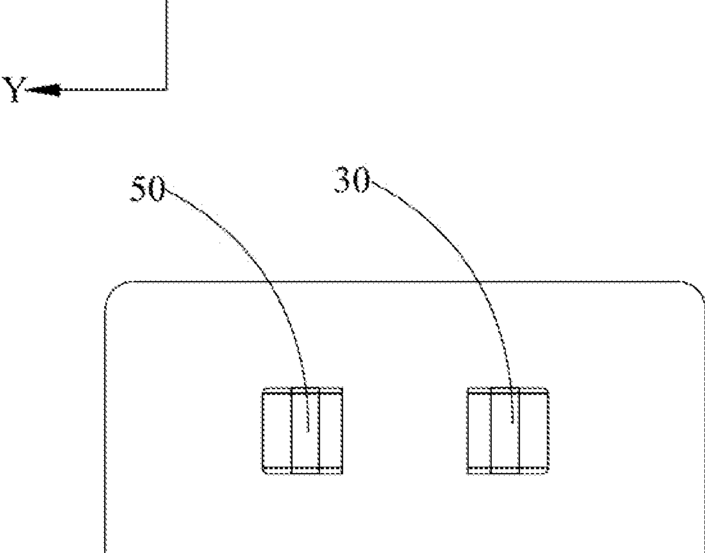
FIG. 10 is a schematic diagram of a positional relationship of a first electrode and a second electrode according to some embodiments of this application.
Figure 11:
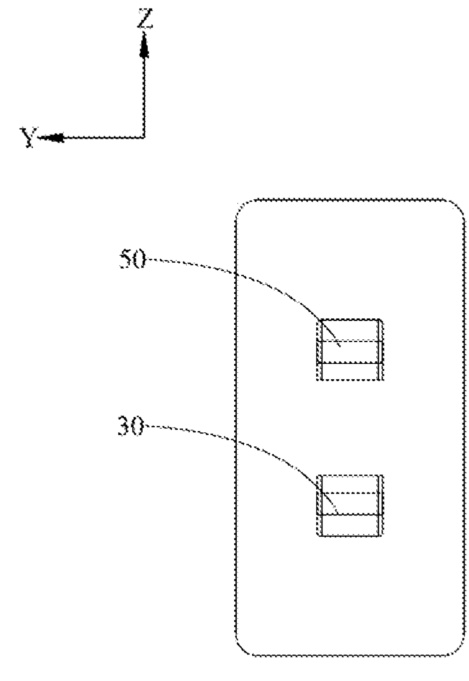
FIG. 11 is a schematic diagram of a positional relationship of a first electrode and a second electrode according to some embodiments of this application.
Figure 12:
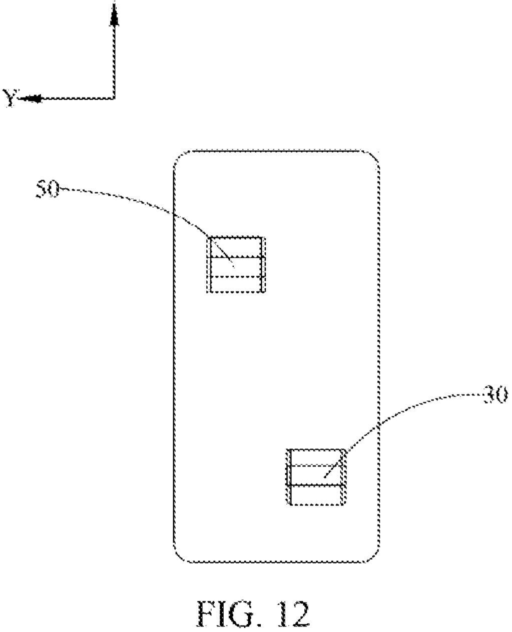
FIG. 12 is a schematic diagram of a positional relationship of a first electrode and a second electrode according to some embodiments of this application.

For positions of the first inserting portion 31 and the second inserting portion, as shown in FIG. 10, the first inserting portion 31 is spaced apart from the second inserting portion in the second direction; or as shown in FIG. 11, the first inserting portion 31 is spaced apart from the second inserting portion in the third direction; or as shown in FIG. 12, the first inserting portion 31 and the second inserting portion are staggered in the second direction. It should be noted that the first inserting portion 31 and the second inserting portion being staggered also means that the first inserting portion 31 and the second inserting portion are staggered in the third direction.

The first inserting portion 31 and the second inserting portion are disposed correspondingly to an insertion hole 41 of the external device 40. With the first inserting portion 31 spaced apart from the second inserting portion in the second direction or the third direction, the external device 40 may be provided with only one insertion hole 41, and the first inserting portion 31 and the second inserting portion are both disposed inside the one insertion hole 41. With the first inserting portion 31 and the second inserting portion staggered in the second direction, the external device 40 needs to be provided with two insertion holes 41 for insertion of the first inserting portion 31 and the second inserting portion respectively.

According to some embodiments of this application, the first inserting portion 31 and the second inserting portion are both configured for inserting into an external device 40, where the outer surfaces of the first inserting portion 31 and the second inserting portion are both provided with a groove for snap fitting with the external device 40. The grooves include a first groove 33 and a second groove, where the first groove 33 is provided at the first inserting portion 31, and the second groove is provided at the second inserting portion.

Figure 4:
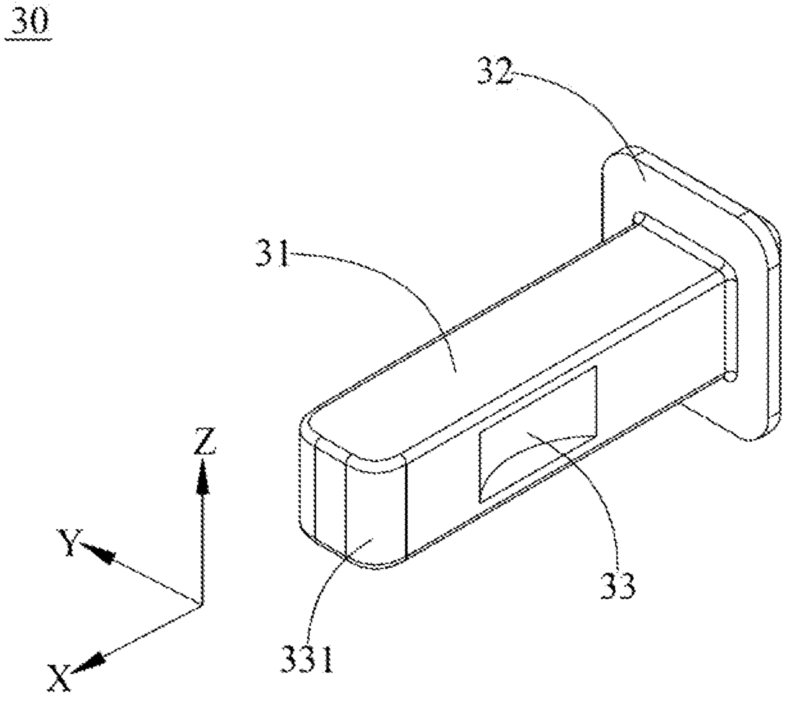
FIG. 4 is a schematic structural diagram of a first electrode according to some embodiments of this application.
Figure 5:
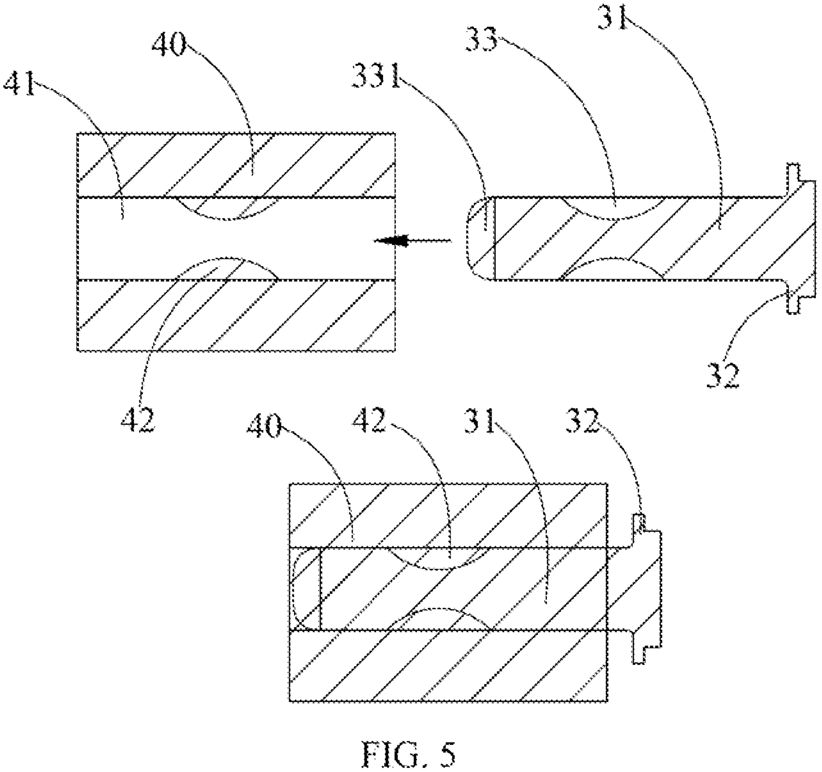
FIG. 5 is a schematic diagram of insertion of a first electrode to an external device according to some embodiments of this application.

With the first electrode 30 as an example, the first flange portion 32 is configured to embeddedly fix the entire first electrode 30 into the second part 12, and the first inserting portion 31 is configured to be inserted into the insertion hole 41 of the external device 40. Refer to FIG. 4 and FIG. 5 together. An outer surface of the first inserting portion 31 is provided with a first groove 33. With a cuboid first inserting portion 31 as an example, the first groove 33 may be provided on one side wall of the first inserting portion 31 or provided on two opposite side walls of the first inserting portion 31. An inner wall of the insertion hole 41 is provided with a first elastic protrusion 42, where the first elastic protrusion 42 corresponds to the first groove 33, and the first groove 33 matches the first elastic protrusion 42 in shape and outline.

When the first inserting portion 31 is inserted into the insertion hole 41 of the external device 40, a head end 331 of the first inserting portion 31 pushes against and compresses the first elastic protrusion 42, and the first elastic protrusion 42 compressed allows the first inserting portion 31 to go deeper into the insertion hole 41. When the first inserting portion 31 is completely inserted into the first insertion hole 41, the first elastic protrusion 42 exactly snap-fits into the first groove 33 embeddedly, so that the first inserting portion 31 is inserted and fixed in the first insertion hole 41 of the external device 40, improving the grip force and bonding strength between the first electrode 30 and the external device 40.

In other embodiments, alternatively, a first groove 33 may be provided on an inner wall of the insertion hole 41, and the first inserting portion 31 is provided with a first elastic protrusion 42; or the first inserting portion 31 is provided with both a first groove 33 and a first elastic protrusion 42, and correspondingly, the inner wall of the insertion hole 41 is provided with a first elastic protrusion 42 and a first groove 33.

In one embodiment, to improve the boding strength between the first inserting portion 31 and the first elastic protrusion 42, the first elastic protrusion 42 may be designed with a slightly larger size than the first groove 33, such that when the first elastic protrusion 42 embeddedly snap-fits into the first groove 33, the first elastic protrusion 42 can still provide an elastic force to the first inserting portion 31, thus further improving the grip force and bonding strength between the first elastic protrusion 42 and the first inserting portion 31.

In one embodiment, to make it easy for the first inserting portion 31 to push against and compress the first elastic protrusion 42, reference is made to FIG. 4 and FIG. 5 together, where the head end 331 of the first inserting portion 31 may be designed with a smooth curved surface. The smooth curved surface facilitates the ease of guiding compression by the first elastic protrusion 42 so that the first inserting portion 31 can be easily inserted into the insertion hole 41.

For the shape of the first groove 33, it may be an arc, a rectangle, a polygon, or the like. In an embodiment, the first groove 33 is preferably an arc. As shown in FIG. 5, the first inserting portion 31 and the first elastic protrusion 42 receive a force that is in parallel to the direction of the first inserting portion 31. When the first inserting portion 31 is inserted into the insertion hole 41, the arc-shaped first groove 33 is in smooth contact with the first elastic protrusion 42, the arc-shaped first groove 33 guides the first elastic protrusion 42 to slide along the arc surface and compresses the first elastic protrusion 42. When the first inserting portion 31 has been completely inserted in the insertion hole 41, the first elastic protrusion 42 embeddedly snap-fits into the first groove 33. During fitting or replacement, when the first inserting portion 31 needs pulling out, the arc-shaped first groove 33 can also guide the first elastic protrusion 42 to slide along the arc surface to make the first elastic protrusion 42 gradually detached from the first groove 33, guaranteeing a smooth job of fitting or replacement for the electrochemical apparatus and the external device 40.

Figure 13:
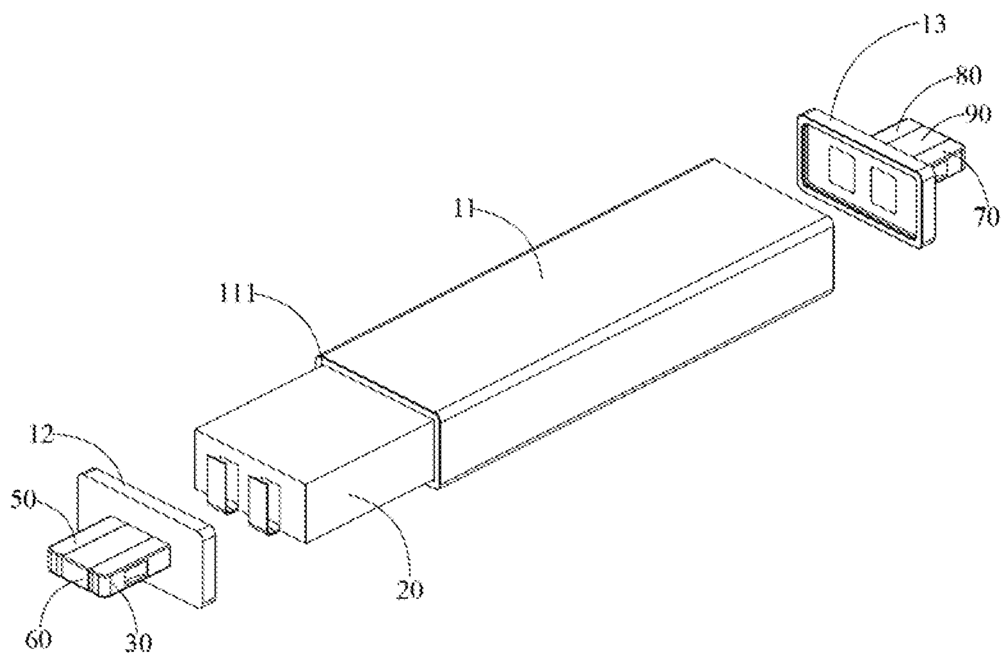
FIG. 13 is a schematic structural diagram of an electrochemical apparatus according to some embodiments of this application.

According to some embodiments of this application, as shown in FIG. 13, the housing 10 further includes a third part 13. The first part 11 is further provided with a second opening (not shown in the figure), where the second opening communicates with the accommodating cavity, the third part 13 is connected to the second opening of the first part 11, and the third part 13 is opposite the second part 12. Like the first part 11 and the second part 12, the third part 13 may also made of hard plastics resistant to electrolyte, for example, LCP, PHBA, PET, PVC, Pi, PP, ABS, PC, or PA. The third part 13 may be connected to the second part 12 through welding, snap fit, or bonding to form the entire outer packaging housing 10.

The electrochemical apparatus further includes a third electrode 70 and a fourth electrode 80, where the third electrode 70 and the fourth electrode 80 are both disposed at the third pan 13 and have opposite polarities. The third electrode 70 is opposite the first electrode 30, and the fourth electrode 80 is opposite the second electrode 50. The third electrode 70 includes a third inserting portion (not shown in the figure) and a third flange portion (not shown in figures), and the fourth electrode 80 includes a fourth inserting portion (not shown in the figure) and a fourth flange portion (not shown in the figure), where the third flange portion and the fourth flange portion both embeddedly snap-fit into the third part 13 and are both connected to the electrode assembly 20, and the third inserting portion and the fourth inserting portion both protrude from an outer surface of the third part 13.

As required, the polarity of the third electrode 70 may be the same as or opposite to the polarity of the first electrode 30. In this embodiment, two ends of the housing 10, that is, the second part 12 and the third part 13, are both provided with electrodes, making it possible to connect a plurality of electrochemical apparatus in series. In the series connection, the first electrode 30 may be connected to the third electrode 70, and the second electrode 50 may be connected to the fourth electrode 80. In addition, because the two ends of the housing 10 are both provided with electrodes, one electrochemical apparatus can be inserted to two external devices 40 to supply power to the two external devices 40 at the same time.

According to some embodiments of this application, as shown in FIG. 13, the electrochemical apparatus further includes a first insulator 60 and a second insulator 90. The first insulator 60 is fixed to the second pan 12 and abuts or snap-fits between the first inserting portion 31 and the second inserting portion.

The first inserting portion 31 and the second inserting portion may be arranged symmetrically, with the first insulator 60 sandwiched therebetween for separation and insulation so as to prevent the first inserting portion 31 and the second inserting portion from being short-circuited. The first inserting portion 31, the first insulator 60, and the second inserting portion may be integrally formed through in-mold decoration technology or machine processing and splicing. The first insulator 60 The first inserting portion 31 is configured to support the first inserting portion 31 and the second inserting portion, and when the two inserting portions are inserted into the external device 40, such design can effectively add to the reliability of insertion of the two inserting portions.

It should be noted that when the first insulator 60 abuts between the first inserting portion 31 and the second inserting portion, no first groove 33 is provided on an end surface of the first inserting portion 31 facing the first insulator 60, and similarly, no second groove is provided on an end surface of the second inserting portion facing the first insulator 60. The external device 40 may be provided with one insertion hole 41, where the first inserting portion 31, the first insulator 60, and the second inserting portion forms an entirety, and the entirety is completely inserted in the insertion hole 41. Based on the same inventive concept, the second insulator 90 is fixed to the third part 13 and abuts or snap-fits between the third inserting portion and the fourth inserting portion.

Furthermore, the surface of the first inserting portion 31 facing the first insulator 60 is provided with a first snap-fit groove (not shown in the figure), the surface of the first insulator 60 facing the first inserting portion 31 is provided with a protruding first snap-fit portion (not shown in the figure), and the first snap-fit portion embeddedly snap-fits into the first snap-fit groove. The surface of the second inserting portion facing the first insulator 60 is provided with a second snap-fit groove (not shown in the figure), the surface of the first insulator 60 facing the second inserting portion is provided with a protruding second snap-fit portion (not shown in the figure), and the second snap-fit portion embeddedly snap-fits into the second snap-fit groove, so that the first inserting portion 31 and the second inserting portion both embeddedly snap-fit into the first insulator 60.

In this embodiment, the first insulator 60 is fixed to the housing 10, and the first inserting portion 31 and the second inserting portion both snap-fit into the first insulator 60. Two sides of the first insulator 60 are both provided with a snap-fit portion, where a first snap-fit portion of the first insulator 60 snap-fits into the first snap-fit groove of the first inserting portion 31 close to the first insulator 60, and a second snap-fit portion of the first insulator 60 snap-fits into the second snap-fit groove of the second inserting portion close to the first insulator 60. Such structure can well fix the first inserting portion 31 and the second inserting portion, improving the stability of the two inserting portions and effectively alleviating the sway or mismatch of the two inserting portions.

It should be noted that the first snap-fit groove may be designed into the form of the first groove 33, and the first inserting portion may be designed into the form of the first elastic protrusion 42. Similarly, the second snap-fit groove may be designed into the form of the second groove, and the second inserting portion may be designed into the form of the second elastic protrusion.

According to some embodiments of this application, in a second aspect, this application further provides an electronic device including the electrochemical apparatus according to any one of the foregoing embodiments. The electronic device in the illustrated embodiments of this application is not particularly limited, and may be any known electronic device used in the prior art. For example, the electronic device may include but is not limited to a notebook computer, a pen-input computer, a mobile computer, an electronic book player, a portable telephone, a portable fax machine, a portable copier, a portable printer, a stereo headset, intelligent glasses, a video recorder, a liquid crystal television, a portable cleaner, a portable CD player, a mini-disc, a transceiver, an electronic notepad, a calculator, a memory card, a portable recorder, a radio, a standby power source, a motor, an automobile, a motorcycle, a power-assisted bicycle, a bicycle, a lighting appliance, a toy, a game console, a clock, an electric tool, a flash lamp, a camera, a large household battery, a lithium-ion capacitor, and a wearable device.

It should be noted that, although this specification and the accompanying drawings of this application have provided preferable embodiments of this application, this application can be implemented in many different forms, without being limited to the illustrated embodiments described in this specification. These embodiments should not be construed as additional limitations on the content of this application, and these embodiments are provided for ease of a more thorough and comprehensive understanding of the disclosed content of this application. In addition, further combinations of the foregoing technical features can form various embodiments not listed above, and all such embodiments are construed as falling within the scope as recorded in this specification of this application. Further, persons of ordinary skill in the art can make improvements or changes based on the foregoing descriptions, and all these improvements and changes shall fall within the protection scope of the claims appended to this application.

What is claimed is:

1. An electrochemical apparatus, comprising a housing, an electrode assembly, and an electrolyte; wherein the housing comprises a first part and a second part interconnected to each other, the electrolyte is stored in the housing, the first part encloses an accommodating cavity, and the electrode assembly is accommodated in the accommodating cavity; and the electrochemical apparatus further comprises a first electrode, wherein the first electrode comprises a first inserting portion and a first flange portion, wherein the first flange portion and the first inserting portion are integrally formed, the first flange portion embeddedly snap-fits into the second part, the first flange portion is connected to the electrode assembly, and the first inserting portion extends away from the accommodating cavity and protrudes from an outer surface of the second part, wherein the electrochemical apparatus further comprises a second electrode, the second electrode being spaced apart from the first electrode; and the second electrode comprises a second inserting portion and a second flange portion, wherein the second flange portion and the second inserting portion are integrally formed, the second flange portion embeddedly snap-fits into the second part, the second flange portion is connected to the electrode assembly, and the second inserting portion extends away from the accommodating cavity and protrudes from the outer surface of the second part, and wherein the first flange portion satisfies at least one of the following conditions:

in the first direction, the first flange portion has a thickness of 0.05 mm to 3 mm, or in the first direction, two sides of the first flange portion abut against a first adhesive layer, the first adhesive layer having a thickness of 0.1 mm to 3 mm; and the second flange portion satisfies at least one of the following conditions:

in the first direction, the second flange portion has a thickness of 0.05 mm to 3 mm, or in the first direction, two sides of the second flange portion abut against a second adhesive layer, the second adhesive layer having a thickness of 0.1 mm to 3 mm.

2. The electrochemical apparatus according to claim 1, wherein the first inserting portion extends at the outer surface of the second part along a first direction; and the first flange portion satisfies at least one of the following conditions:

in a second direction, the first flange portion is wider than the first inserting portion, or in a third direction, the first flange portion is higher than the first inserting portion;

wherein the first direction, the second direction, and the third direction are perpendicular to each other.

3. The electrochemical apparatus according to claim 2, wherein the second inserting portion extends at the outer surface of the second part along the first direction; and the second flange portion satisfies at least one of the following conditions:

in the second direction, the second flange portion is wider than the second inserting portion, or in the third direction, the second flange portion is higher than the second inserting portion.

4. The electrochemical apparatus according to claim 1, wherein the second part is provided with a first snap-fit cavity and a first extension hole, the first snap-fit cavity communicating with the first extension hole;

the first flange portion embeddedly snap-fits into the first snap-fit cavity, and the first snap-fit cavity communicates with the accommodating cavity;

the first inserting portion extends out of the first extension hole and protrudes from the outer surface of the second part;

the second part is further provided with a second snap-fit cavity and a second extension hole, the second snap-fit cavity communicating with the second extension hole;

the second flange portion embeddedly snap-fits into the second snap-fit cavity and the second snap-fit cavity communicates with the accommodating cavity; and the second inserting portion extends out of the second extension hole and protrudes from the outer surface of the second part.

5. The electrochemical apparatus according to claim 4, wherein the electrochemical apparatus comprises a plurality of first flange portions and a plurality of first snap-fit cavities, wherein the plurality of first flange portions are stacked sequentially along a direction from the plurality of first snap-fit cavities to the first extension hole, two adjacent first flange portions have different lengths in a direction perpendicular to the stacking direction of the plurality of first flange portions, and each first flange portion snap-fits into one of a matching first snap-fit cavities.

6. The electrochemical apparatus according to claim 5, wherein, the electrochemical apparatus comprises a plurality of second flange portions and a plurality of second snap-fit cavities, wherein the plurality of second flange portions are stacked sequentially along a direction from the plurality of second snap-fit cavities to the second extension hole, two adjacent second flange portions have different lengths in a direction perpendicular to the stacking direction of the plurality of second flange portions, and each second flange portion snap-fits into one of a matching second snap-fit cavity.

7. The electrochemical apparatus according to claim 1, wherein the first inserting portion and the second inserting portion are both configured for inserting into an external device, wherein the outer surfaces of the first inserting portion and the second inserting portion are both provided with a groove for snap fitting with the external device.

8. The electrochemical apparatus according to claim 1, wherein the housing further comprises a third part, wherein the third part is connected to the first part, and the third part is opposite the second part;

the electrochemical apparatus further comprises a third electrode and a fourth electrode, wherein the third electrode is opposite the first electrode, and the fourth electrode is opposite the second electrode; and the third electrode comprises a third inserting portion and a third flange portion, and the fourth electrode comprises a fourth inserting portion and a fourth flange portion, wherein the third flange portion and the fourth flange portion both embeddedly snap-fit into the third part and are both connected to the electrode assembly, and the third inserting portion and the fourth inserting portion both protrude from an outer surface of the third part.

9. The electrochemical apparatus according to claim 8, wherein the electrochemical apparatus further comprises a first insulator and a second insulator;

the first insulator is fixed to the second part and abuts or snap-fits between the first inserting portion and the second inserting portion; and the second insulator is fixed to the third part and abuts or snap-fits between the third inserting portion and the fourth inserting portion.

10. An electronic device, comprising an electrochemical apparatus, the electrochemical apparatus comprising a housing, an electrode assembly, and an electrolyte; wherein the housing comprises a first part and a second part interconnected to each other, the electrolyte is stored in the housing, the first part encloses an accommodating cavity, and the electrode assembly is accommodated in the accommodating cavity; and the electrochemical apparatus further comprises a first electrode, wherein the first electrode comprises a first inserting portion and a first flange portion, wherein the first flange portion and the first inserting portion are integrally formed, the first flange portion embeddedly snap-fits into the second part, the first flange portion is connected to the electrode assembly, and the first inserting portion extends away from the accommodating cavity and protrudes from an outer surface of the second part, wherein the electrochemical apparatus further comprises a second electrode, the second electrode being spaced apart from the first electrode; and the second electrode comprises a second inserting portion and a second flange portion, wherein the second flange portion and the second inserting portion are integrally formed, the second flange portion embeddedly snap-fits into the second part, the second flange portion is connected to the electrode assembly, and the second inserting portion extends away from the accommodating cavity and protrudes from the outer surface of the second part, and wherein the first flange portion satisfies at least one of the following conditions:

in the first direction, the first flange portion has a thickness of 0.05 mm to 3 mm, or in the first direction, two sides of the first flange portion abut against a first adhesive layer, the first adhesive layer having a thickness of 0.1 mm to 3 mm; and the second flange portion satisfies at least one of the following conditions:

in the first direction, the second flange portion has a thickness of 0.05 mm to 3 mm, or in the first direction, two sides of the second flange portion abut against a second adhesive layer, the second adhesive layer having a thickness of 0.1 mm to 3 mm.

11. The electronic device according to claim 10, wherein the first inserting portion extends at the outer surface of the second part along a first direction; and the first flange portion satisfies at least one of the following conditions:

in a second direction, the first flange portion is wider than the first inserting portion; or in a third direction, the first flange portion is higher than the first inserting portion;

wherein the first direction, the second direction, and the third direction are perpendicular to each other.

12. The electronic device according to claim 11, wherein the second inserting portion extends at the outer surface of the second part along the first direction; and the second flange portion satisfies at least one of the following conditions:

in the second direction, the second flange portion is wider than the second inserting portion; or in the third direction, the second flange portion is higher than the second inserting portion.

13. The electronic device according to claim 10, wherein the second part is provided with a first snap-fit cavity and a first extension hole, the first snap-fit cavity communicating with the first extension hole;

the first flange portion embeddedly snap-fits into the first snap-fit cavity, and the first snap-fit cavity communicates with the accommodating cavity;

the first inserting portion extends out of the first extension hole and protrudes from the outer surface of the second part;

the second part is further provided with a second snap-fit cavity and a second extension hole, the second snap-fit cavity communicating with the second extension hole;

the second flange portion embeddedly snap-fits into the second snap-fit cavity and the second snap-fit cavity communicates with the accommodating cavity; and the second inserting portion extends out of the second extension hole and protrudes from the outer surface of the second part.

14. The electronic device according to claim 13, wherein the electrochemical apparatus comprises a plurality of first flange portions and a plurality of first snap-fit cavities, wherein the plurality of first flange portions are stacked sequentially along a direction from the plurality of first snap-fit cavities to the first extension hole, two adjacent first flange portions have different lengths in a direction perpendicular to the stacking direction of the plurality of first flange portions, and each first flange portion snap-fits into one of a matching first snap-fit cavity.

15. The electrochemical apparatus according to claim 14, wherein, the electrochemical apparatus comprises a plurality of second flange portions and a plurality of second snap-fit cavities, wherein the plurality of second flange portions are stacked sequentially along a direction from the plurality of second snap-fit cavities to the second extension hole, two adjacent second flange portions have different lengths in a direction perpendicular to the stacking direction of the plurality of second flange portions, and each second flange portion snap-fits into one of a matching second snap-fit cavity.

16. The electronic device according to claim 10, wherein the first inserting portion and the second inserting portion are both configured for inserting into an external device, wherein the outer surfaces of the first inserting portion and the second inserting portion are both provided with a groove for snap fitting with the external device.

* * * * *